(12) United States Patent
Naya

(10) Patent No.: US 10,295,809 B2
(45) Date of Patent: May 21, 2019

(54) OPTICAL ELEMENT, EXTENDED OPTICAL ELEMENT COMPRISING OPTICAL ELEMENT, AND LAMP HOUSING

(71) Applicant: FUJIFILM Corporation, Tokyo (JP)

(72) Inventor: Masayuki Naya, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 135 days.

(21) Appl. No.: 15/273,172

(22) Filed: Sep. 22, 2016

(65) Prior Publication Data

US 2017/0010451 A1 Jan. 12, 2017

Related U.S. Application Data

(63) Continuation of application No. PCT/JP2015/001695, filed on Mar. 25, 2015.

(30) Foreign Application Priority Data

Mar. 27, 2014 (JP) .................. 2014-065857
Aug. 15, 2014 (JP) .................. 2014-165346

(51) Int. Cl.
*G02B 17/00* (2006.01)
*G02B 5/04* (2006.01)
*G02B 19/00* (2006.01)

(52) U.S. Cl.
CPC ............ *G02B 17/004* (2013.01); *G02B 5/04* (2013.01); *G02B 19/0014* (2013.01); *G02B 19/0061* (2013.01); *G02B 17/006* (2013.01)

(58) Field of Classification Search
CPC ...... G02B 17/004; G02B 17/006; G02B 5/04; F21V 5/02; F21V 5/08; F21V 2200/00; F21V 2200/40

(Continued)

(56) References Cited

U.S. PATENT DOCUMENTS 5,274,536 A * 12/1993 Sato ................... B60Q 3/43
362/260
7,050,171 B1 * 5/2006 Banerjee ............... G01J 3/4532
356/450

(Continued)

FOREIGN PATENT DOCUMENTS

CN 102519356 A 6/2012
CN 102866448 A 1/2013

(Continued)

OTHER PUBLICATIONS

"Physics demonstrations: cloaking device?", by Skulls in the Stars, Apr. 25, 2013, 7 pages. [URL: http://skullsinthestars.com/2013/04/25/physics-demonstrations-cloaking-device/ ] (color version).*

(Continued)

*Primary Examiner* — Frank G Font
(74) *Attorney, Agent, or Firm* — Birch, Stewart, Kolasch & Birch, LLP

(57) ABSTRACT

An optical element is constituted of a polygonal column-shaped transparent body which has four inner wall surfaces that surround a rectangular column-shaped space having a square-shaped opening when seen in a plan view, four outer wall surfaces that are respectively parallel to the inner wall surfaces, and two outer wall surfaces which are perpendicular to a diagonal line of the square-shaped opening and face each other, in which the distance between the two outer wall surfaces facing each other is longer than the diagonal line.

15 Claims, 15 Drawing Sheets

(58) Field of Classification Search
USPC .................. 359/834–836; 362/620, 626, 339
See application file for complete search history.

(56) References Cited

U.S. PATENT DOCUMENTS

| | | | | |
|---|---|---|---|---|
| 7,352,512 | B2* | 4/2008 | Seiden ............... | G02B 27/0972 |
| | | | | 359/629 |
| 9,405,118 | B1* | 8/2016 | Lu ......................... | G02B 27/00 |
| 2009/0303416 | A1* | 12/2009 | Jeong .................... | G02B 5/045 |
| | | | | 349/64 |
| 2018/0126772 | A1* | 5/2018 | Yashiki ............... | G02B 17/006 |

FOREIGN PATENT DOCUMENTS

| | | |
|---|---|---|
| JP | 2005-316087 A | 11/2005 |
| JP | 2013-171252 A | 9/2013 |

OTHER PUBLICATIONS

"Physics demonstrations: cloaking device?", Skulls in the Stars, Apr. 25, 2013, 7 pages. [URL: http://skullsinthestars.com/2013/04/25/physics-demonstrations-cloaking-device/].
International Search Report for PCT/JP2015/001695 (PCT/ISA/210) dated Aug. 11, 2015.
Written Opinion of the International Searching Authority for PCT/JP2015/001695 (PCT/ISA/237) dated Aug. 11, 2015.
Chinese Office Action and Search Report dated Feb. 8, 2018 for Chinese Application No. 201580016020.0, with English translation of Office Action.

\* cited by examiner

OPTICAL ELEMENT, EXTENDED OPTICAL ELEMENT COMPRISING OPTICAL ELEMENT, AND LAMP HOUSING

CROSS-REFERENCE TO RELATED APPLICATIONS

This application is a Continuation of PCT International Application No. PCT/JP2015/001695 filed on Mar. 25, 2015, which claims priority under 35 U.S.C. § 119(a) to Japanese Patent Application No. 2014-065857 filed on Mar. 27, 2014 and Japanese Patent Application No. 2014-165346 filed on Aug. 15, 2014. Each of the above applications is hereby expressly incorporated by reference, in its entirety, into the present application.

BACKGROUND OF THE INVENTION

1. Field of the Invention

The present invention relates to a technique for showing articles transparent and particularly to an optical element that can be used to show articles transparent. In addition, the present invention relates to an extended optical element comprising the optical element and a lamp housing.

2. Description of the Related Art

There are techniques for providing augmented reality (AR) or mixed reality (MR) by projecting images on the surfaces of articles. In addition, among these techniques, there are techniques for making it difficult for the presence of articles to be recognized by presenting images behind the articles (hereinafter, referred to as "background images") on the surfaces of the articles. Specifically, in these techniques, background images that are well harmonized with environments around articles (external environments) are presented (projected or the like) to the surfaces of the articles. In such a case, it is possible to make the articles indistinguishable from the external environments. As a result, the sense of presence of the articles fades (the articles becomes cognitively transparent).

JP2013-171252A discloses a technique for making articles cognitively transparent by projecting a plurality of background images on the surfaces of the articles.

Meanwhile, Skulls in the Stars, "Physics demonstrations: cloaking device?" Posted on Apr. 25, 2013 by skullsinthestars [accessed on Mar. 17, 2014], internet <URL: http://skullsinthestars.com/2013/04/25/physics-demonstrations-cloaking-device/> discloses total reflective type optical camouflage techniques in which structures obtained by combining eight triangular prisms together are used.

SUMMARY OF THE INVENTION

FIGS. 23 and 24 are a plan view and a perspective view illustrating an optical camouflage structure 100 disclosed by Skulls in the Stars, "Physics demonstrations: cloaking device?" Posted on Apr. 25, 2013 by skullsinthestars [accessed on Mar. 17, 2014], internet <URL: http://skullsinthestars.com/2013/04/25/physics-demonstrations-cloaking-device/>. Here, the structure has a constitution in which eight triangular prisms 101a to 101h are combined together and a columnar space having a square-shaped opening in the center is provided and has a constitution in which light Lin incident through the surfaces of the prisms 101h and 101g undergoes repetitive total reflection in the prisms and is extracted through the surfaces of the prisms 101c and 101d. When the structure 100 is seen from the light exit surface side, a portion present in the space (the stem of a flower 115) of an article inserted into the space in the center of the structure 100 (the flower 115 in the drawing) is made to look transparent, and a pencil 116 located on the light incident surface side of the structure 100 is shown from the exit surface.

However, the optical camouflage structure 100 disclosed by Skulls in the Stars, "Physics demonstrations: cloaking device?" Posted on Apr. 25, 2013 by skullsinthestars [accessed on Mar. 17, 2014], internet <URL: http://skullsinthestars.com/2013/04/25/physics-demonstrations-cloaking-device/> is constituted by combining eight triangular prisms and thus has extremely poor handling properties. Prisms 101h and 101g and prisms 101c and 101d are disposed so that the respective edges come into contact with each other, and thus it is difficult to maintain the structure in a combined state or move the structure to installation places.

The present invention has been made in consideration of the above-described circumstances, and an object of the present invention is to provide an optical element which has favorable handling properties and thus can be easily maintained and installed and is capable of making articles look transparent.

In addition, another object of the present invention is to provide a lamp housing comprising the optical element.

A first optical element of the present invention comprises a polygonal column-shaped transparent body which has four inner wall surfaces that surround a rectangular column-shaped space having a square-shaped opening when seen in a plan view, four outer wall surfaces that are respectively parallel to the inner wall surfaces, two outer wall surfaces which are perpendicular to a diagonal line of the square-shaped opening and face each other, and two side wall surfaces that are perpendicularly connected to at least one of the two outer wall surfaces and are connected to at least one of the four outer wall surfaces, in which, in the transparent body, a distance between the two outer wall surfaces facing each other is longer than the diagonal line, and light perpendicularly incident on one outer wall surface of the two outer wall surfaces facing each other undergoes repetitive total reflection on the inner wall surfaces and the outer wall surfaces and, finally, exits along almost the same axis as a light axis of light incident through the other outer wall surface of the two outer wall surfaces facing each other.

Meanwhile, here, transparent bodies refer not only to transparent bodies having a light transmittance of 90% or higher but also to semi-transparent bodies having a light transmittance of approximately 20%, and any elements can be considered as transparent bodies as long as the elements have a light transmittance so that, when the elements are seen from one outer wall surface, landscapes of the other outer wall side are visible. Even when elements absorb or reflect light having specific wavelengths, any elements having a total light transmittance of 20% in the visible light range may be considered as transparent bodies.

The first optical element of the present invention may be an integral structure or be constituted of a plurality of separable members.

A second optical element of the present invention has a main body portion formed by connecting two prismatic bodies having parallelogram-shaped bottom surfaces having inner angles of 45° and 135° using one side surface of each of the two prismatic bodies as a connection surface so that the 45° inner angles and the 135° inner angles of the respective parallelogram-shaped bottom surfaces come close to each other and at least one cuboid-shaped protrusion portion which protrudes outside from a surface facing the connection surface of the main body portion and has a surface parallel to the facing surface. Meanwhile, in the present specification, the inner angles of 45° and 135° may have an error of ±5°, which also applies to a third optical element described below.

In the second optical element of the present invention, the two prismatic bodies preferably have the same shape.

The first optical element of the present invention can also be constituted by bringing the protrusion portions close to each other so that the two second optical elements of the present invention are symmetrically disposed and combined together.

A third optical element of the present invention is an optical element formed by disposing two prismatic bodies having parallelogram-shaped bottom surfaces having inner angles of 45° and 135° so that, when seen in a plan view, one of two sides of one prismatic body which constitute the 45° inner angle is brought into contact with the corresponding side of the other prismatic body so as to form an angle of 90° and connecting side surfaces of the two prismatic bodies as a single surface to one surface of a parallel plate.

In the third optical element of the present invention, the two prismatic bodies preferably have the same shape.

The first optical element of the present invention may be constituted by symmetrically disposing the two third optical elements of the present invention so that side surfaces facing the other side surfaces of the prismatic bodies face each other.

In the first to third optical elements of the present invention, a refractive index is preferably 1.41 or higher.

A material of the transparent body is preferably any one of acryl, polycarbonate, cycloolefin-based resin, and glass or a mixture of two or more of these materials.

The optical element of the present invention may further comprise a screen that covers side surfaces other than the two outer wall surfaces facing each other.

An extended optical element of the present invention is formed by combining one or more second optical elements in which the two prismatic bodies have the same shape with the first optical element of the present invention, whereby one outer wall surface and the other outer wall surface of the two outer wall surfaces facing each other are extended.

A lamp housing of the present invention comprises the optical element of the present invention and a lamp disposed in a rectangular column-shaped space surrounded by the four inner walls of the optical element.

The lamp housing of the present invention, may further comprise: a reflection plate having an arc sectional shape which reflects light from the lamp in the rectangular column-shaped space of the optical element.

The lamp housing of the present invention, may further comprise: a reflection plate that covers at least a part of the four outer wall surfaces of the optical element and/or a diffusion plate.

The lamp housing of the present invention, may further comprise: a reflection plate that covers a top surface of the optical element.

The first optical element of the present invention includes a polygonal column-shaped transparent body which has four inner wall surfaces that surround a rectangular column-shaped space having a square-shaped opening when seen in a plan view, four outer wall surfaces that are respectively parallel to the inner wall surfaces, and two outer wall surfaces which are perpendicular to a diagonal line of the square-shaped opening and face each other, in which, in the transparent body, a distance between the two outer wall surfaces facing each other is longer than the diagonal line, and has a distance between the two outer wall surfaces facing each other which is longer than a diagonal line of the square-shaped opening, and thus handling properties are extremely favorable compared with optical camouflage structures of the related art comprising a portion which is constituted by combining eight triangular prisms and in which edges of the respective prisms are brought into contact with each other on both light incidence and exit surfaces.

Meanwhile, when the transparent body is constituted of a single member, assembly is unnecessary, and furthermore, handling properties improve. Even in a case in which the transparent body consists of a plurality of members, the distance between the two outer wall surfaces facing each other is longer than the diagonal line of the square-shaped opening, and thus the optical element has a constitution in which some of members are always brought into contact with each other on surfaces when assembling the members, and thus structural stability is excellent.

In the optical element of the present invention, light perpendicularly incident on one outer wall surface of the two outer wall surfaces facing each other undergoes repetitive total reflection on the inner wall surfaces and the outer wall surfaces and, finally, exits along almost the same axis as the light axis of light incident through the other outer wall surface of the two outer wall surfaces facing each other, and thus landscapes of one outer wall surface side, that is, background images behind the element can be seen from the other outer wall surface.

DESCRIPTION OF THE PREFERRED EMBODIMENTS

Hereinafter, embodiments of the present invention will be described with reference to the accompanying drawings.

Figure 1:
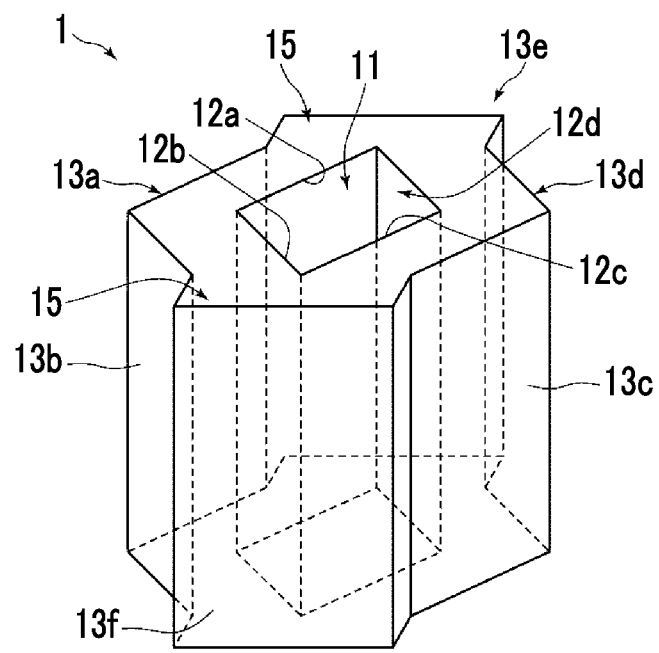
FIG. 1 is a perspective view of a first embodiment of an optical element of the present invention.
Figure 2:
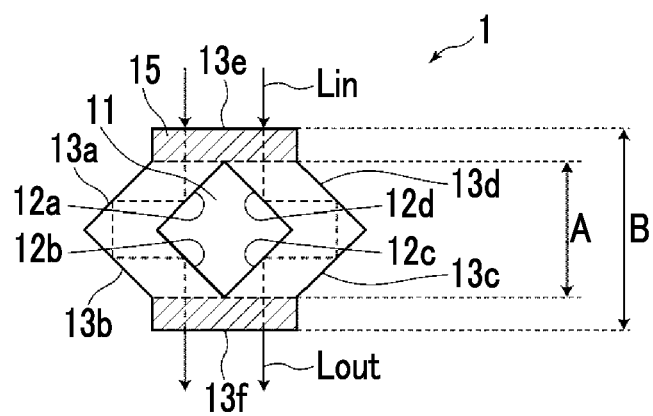
FIG. 2 is a plan view of the optical element illustrated in FIG. 1.

FIG. 1 is a perspective view of an optical element 1 of a first embodiment of the present invention, and FIG. 2 is a plan view of the optical element 1 illustrated in FIG. 1.

As illustrated in FIGS. 1 and 2, the optical element 1 includes a polygonal column-shaped transparent body which has four inner wall surfaces 12a to 12d that surround a rectangular column-shaped space 11 having a square-shaped opening when seen in a plan view, four outer wall surfaces 13a to 13d that are respectively parallel to the inner wall surfaces 12a to 12d, and two outer wall surfaces 13e and 13f which are perpendicular to a diagonal line of the square-shaped opening and face each other, in which, in the transparent body, a distance B between the two outer wall surfaces 13e and 13f facing each other is longer than a length A of the diagonal line of the square-shaped opening.

Light Lin perpendicularly incident on one outer wall surface 13e of the two outer wall surfaces 13e and 13f facing each other undergoes repetitive total reflection in the inner wall surfaces 12a to 12d and the outer wall surfaces 13a to 13d and, finally, exits through the other outer wall surface 13f. In more detail, light incident through the outer wall surface 13e is totally reflected on the inner wall surfaces 12a and 12d that are formed to be inclined 45° with respect to the outer wall surface 13e, and the light path is changed 90°. After that, the light is incident at an angle of 45° on the outer wall surfaces 13a and 13d that are parallel to the inner wall surfaces 12a and 12d and is totally reflected on the outer wall surfaces 13a and 13d, and the light path is changed 90°. The light is further incident at an angle of 45° on the outer wall surfaces 13b and 13c and is totally reflected on the outer wall surfaces 13b and 13c, and, furthermore, the light path is changed 90°. After that, the light is incident at an angle of 45° on the inner wall surfaces 12b and 12c that are parallel to the outer wall surfaces 13b and 13c and is totally reflected, the light path is changed 90°, and exits through the outer wall surface 13f. At this time, exiting light Lout is extracted along almost the same axis as the light axis of the light Lin incident on the other outer wall surface 13e.

Since the optical element has a constitution in which light incident through the outer wall surface 13e exits through the outer wall surface 13f as described above, when the optical element 1 is directly seen from the outer wall surface 13f side of the optical element 1, an article disposed in the rectangular column-shaped space 11 is not visible (made to look transparent) from the outer wall surface 13f side, and landscapes (backgrounds) of the outer wall 13d side of the optical element 1 are visible from the outer wall surface 13f. Therefore, the present optical element 1 can be used as an image camouflage element.

Here, a case in which one outer wall surface 13e of the two outer wall surfaces 13e and 13f facing each other is used as a light incidence surface, the other outer wall surface 13f is used as an exit surface, and the optical element 1 is seen from the outer wall surface 13e side has been described; however, in a case in which the optical element 1 is seen from the outer wall surface 13e side, landscapes of the other outer wall surface 13f side are visible.

Meanwhile, the surface accuracy of the inner wall surfaces 12a to 12d and the outer wall surfaces 13a to 13d on which incident light is totally reflected is preferably the incident light wavelength λ or shorter. Here, incident light is assumed to be visible light, and the surface accuracy is preferably approximately 0.4 µm or shorter. When the surface accuracy becomes larger than the incident light wavelength, scattered light and the like are generated during incidence of light, reflectivity lowers, and permeability as elements degrades.

The optical element 1 of the present embodiment is an element integrally constituted of a single transparent body and can be manufactured by, for example, extrusion molding, injection molding, or the like. Any materials used to produce transparent or semi-transparent bodies may be used as long as the materials have a refractive index higher than the refractive index of the air; however, particularly, the refractive index is preferably 1.41 or higher. For example, the optical element is preferably constituted of any one of acryl, polycarbonate, cycloolefin-based resin, and glass or a mixture of two or more of these materials. Resin materials are inexpensive and can be easily molded.

Compared with optical camouflage structures of the related art which are constituted by combining eight triangular prisms, the optical element 1 of the present embodiment has extremely favorable handling properties. In the constitution in which eight triangular prisms were combined together, handling properties were poor, and the degree of freedom in design was low. In addition, since there were portions in which prisms were connected to each other with edges thereof brought into contact with each other (linearly-connected portions), there was a problem with stability. In contrast, the optical element 1 of the present embodiment is an integrally constituted element, and thus the above-described problem is not caused. In addition, in the plan view of FIG. 2, shaded portions 15 in the transparent optical element are portions present due to the distance between the outer wall surfaces 13e and 13f set to be longer than the diagonal line of the square-shaped opening and do not contribute to path changes caused by the total reflection of light; however, when optical elements comprise a cuboid portion including the outer wall surface 13e as described above or a cuboid portion including the outer wall surface 13f, it is possible to use the cuboid portions as grip portions while handling the optical element and facilitate the maintenance and handling of the element.

FIGS. 3 to 7 illustrate plan views of optical elements of design modification examples 1 to 5. In the respective drawings, the same components as in the optical element 1 of the above-described embodiment will be given the same reference signs and will not be described in detail.

Figure 3:
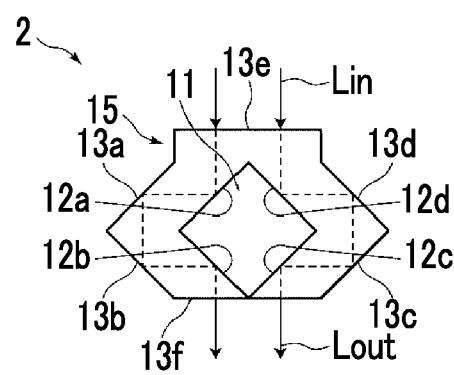
FIG. 3 is a plan view of an optical element of a design modification example 1 of the first embodiment.

An optical element 2 of the design modification example 1 illustrated in FIG. 3 has a shorter distance between the outer wall surfaces 13e and 13f facing each other than that in the optical element 1 of FIG. 1 and has a shape in which the inner wall surfaces 12b and 12c are in point-contact (actually line-contact) with each other on the outer wall surface 13f side when seen in a plan view.

In the optical element 2 as well, light Lin incident through the outer wall surface 13e undergoes repetitive total reflection inside and exits through the other outer wall surface 13f. The cuboid portion 15 in the optical element 1 is not present on the outer wall surface 13f side through which existing light Lout exists in the element 2 of the present example. However, since the optical element is constituted of a single member (part) and comprises a cuboid portion on the outer wall surface 13d side, it is possible to use the cuboid portion as a grip portion, and thus the optical element has the same handling properties as in the optical element 1.

Figure 4:
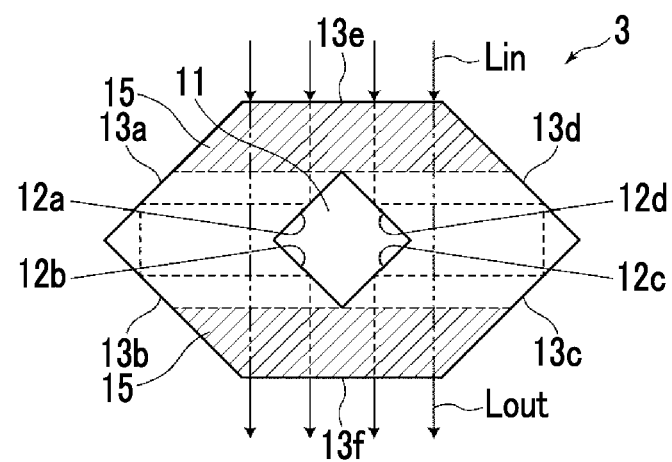
FIG. 4 is a plan view of an optical element of a design modification example 2 of the first embodiment.

Like an optical element 3 of a design modification example 2 illustrated in FIG. 4, it is also possible to increase the thicknesses between the inner wall surfaces 12a to 12d and the outer wall surfaces 13a to 13d, thereby forming the horizontal widths of the outer wall surfaces 13e and 13f which serve as incidence and exit surfaces to be wider. In addition, the thicknesses of the portions 15 having no relationship with total reflection in the optical element do not need to be thick as long as the thicknesses are thick enough to maintain the structure, and, although the portion has a cuboid shape in the optical element 1 of the embodiment, in the present embodiment, the portions have a trapezoidal shape. The portions more preferably have a cuboid shape since users are able to easily grip the side surfaces.

Like the present optical element 3, in a case in which the horizontal widths of the outer wall surfaces 13e and 13f which serve as incidence and exit surfaces are wider than the diagonal line of the rectangular column-shaped space 11 in the optical element, in a case in which there are no inner wall surfaces in the straight path of light, incident light through the outer wall surface 13e simply passes through the optical element 3 and exits through the other outer wall surface 13f. However, in a case in which there are inner wall surfaces, incident light undergoes repetitive total reflection on the inner wall surfaces and the outer wall surfaces that are parallel to the inner wall surfaces and, finally, exits along the same axis as the incident light through the outer wall surface 13f.

Figure 5:
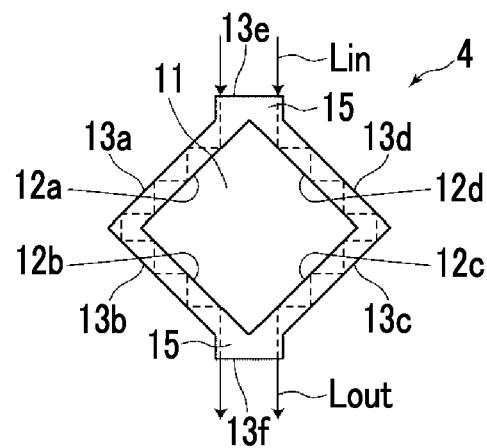
FIG. 5 is a plan view of an optical element of a design modification example 3 of the first embodiment.

In an optical element 4 of a design modification example 3 illustrated in FIG. 5, the thicknesses between the inner wall surfaces 12a to 12d and the outer wall surfaces 13a to 13d are formed to be thinner than the rectangular column-shaped space 11 provided in the center of the optical element. Although the optical element 1 of the first embodiment has the constitution in which light incident through one outer wall surface 13e of the two outer wall surfaces 13e and 13f facing each other is totally reflected once on each of the inner wall surfaces and the outer wall surfaces and exits through the outer wall surface 13f, in the present optical element 4, incident light is repetitively reflected multiple times on each of the inner wall surfaces and the outer wall surfaces and exit. Even when incident light is repetitively reflected multiple times as described above, the light axes of incident light and exiting light become almost the same light axis.

Figure 6:
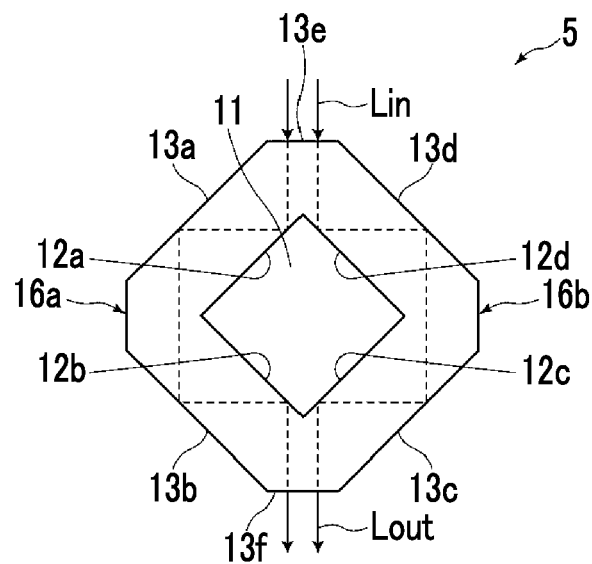
FIG. 6 is a plan view of an optical element of a design modification example 4 of the first embodiment.

An optical element 5 of a design modification example 4 illustrated in FIG. 6 comprises the outer wall surfaces 13e and 13f and outer wall surfaces 16a and 16b which, respectively, perpendicularly intersect two diagonal lines of the square-shaped opening in the rectangular column-shaped space 11 provided in the center of the optical element and face each other.

In a case in which the horizontal widths of the outer wall surfaces 13e and 13f which serve as incidence and exit surfaces are narrow, light reflected on the inner wall surfaces 12a and 12d is incident on the outer wall surfaces 13a and 13b, but it is preferable to provide the outer wall surfaces 13a and 13b which are inclined 45° with respect to the light travel direction in the incidence range of this light, and the shapes of portions unnecessary for the reflection of incident light on the outer wall surfaces parallel to the inner wall surfaces are not particularly limited; however, the present example has a structure in which another pair of the outer wall surfaces 16a and 16b facing each other are provided.

The present optical element 5 has a shape which is four-fold rotationally symmetric to a central axis located at the central point of the element 5 when seen in a plan view, the relationship between the outer wall surfaces 16a and 16b facing each other is the same as the relationship between the outer wall surfaces 13e and 13f, and light incident through one of the outer wall surfaces undergoes total refection in the element and exits through the other outer wall surface.

Figure 7:
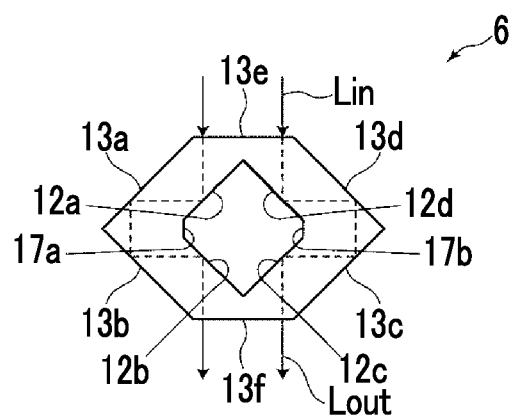
FIG. 7 is a plan view of an optical element of a design modification example 5 of the first embodiment.

In an optical element 6 of a design modification example 5 illustrated in FIG. 7, the shape of the opening in the rectangular column-shaped space 11 provided in the center of the optical element is not a square shape but a hexagonal shape in which a pair of two facing edges of a square shape are chipped off. The inner wall surfaces 12a and 12d inclined 45° with respect to the outer wall surface 13e are provided at portions in which light incident through the outer wall surface 13e is reflected, and the light path is changed 90° on these inner wall surfaces. The inner wall surfaces 12a and 12d needs to be present in the width of the outer wall surface 13e on which light is incident, and portions outside the width of the outer wall surface 13e need to have shapes that do not hinder the light path of light. In the present example, surfaces 17a and 17b perpendicular to the outer wall surface 13e are formed. Therefore, in the present invention, the optical element has four inner wall surfaces that surround the rectangular column-shaped space having a square-shaped opening when seen in a plan view, but cases in which the opening has a shape formed by chipping off parts of a square shape in portions having no relationship with reflection as in the present application are also included in the scope of the present invention.

The optical element 1 of the first embodiment and the optical elements 2 to 6 of the design modification examples 1 to 5 are constituted of a single transparent part (member), but the optical elements 1 to 6 may be constituted of two transparent parts. Furthermore, optical elements may be constituted of a plurality of (more than two, for example, three or four) members. However, since handling properties degrade as the number of members increases, optical elements are particularly preferably constituted of two or less members.

Figure 8:
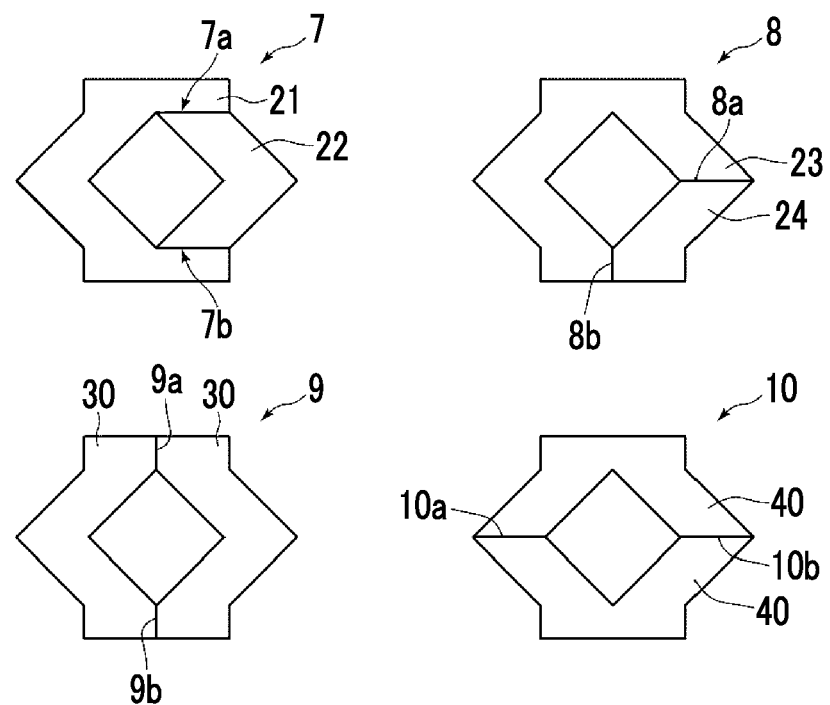
FIG. 8 is a plan view for describing an optical element consisting of two parts.

FIG. 8 illustrates plan views of optical elements 7 to 10 having the same shape as that of the optical element 1 of the first embodiment, and, here, the optical elements 7 to 10 are respectively constituted of two parts.

The optical element 7 is constituted of a first part 21 including a parallel plate combined to an end portion of a columnar body having an L-shaped planar shape and a second part 22 that is a columnar body having an L-shaped planar shape.

The optical element 8 is constituted of a first part 23 including three inner wall surfaces and outer surfaces parallel thereto and a second part 24 including one inner wall surface and an outer wall surface parallel thereto.

The optical element 9 is constituted by symmetrically disposing two parts 30 having the same shape, and the optical element 10 is, similarly, constituted by symmetrically disposing two parts 40 having the same shape.

All of the optical elements 7 to 10 are constituted of two parts (members), and, in all of the optical elements, the parts are always disposed by bringing the surfaces into contact with each other. In the optical element 7, the first part 21 and the second part 22 are connected to each other on surfaces 7a and 7b, and, in the optical element 8, the first part 23 and the second part 24 are connected to each other on surfaces 8a and 8b. Similarly, in the optical element 9, two parts 30 having the same shape are connected to each other on surfaces 9a and 9b, and, in the optical element 10, two parts 40 having the same shape are connected to each other on surfaces 10a and 10b. In all of the optical elements, since the two parts are combined together by being brought into contact with each other on the surfaces, it is possible to stably form structures, and, when the number of the parts is two, handling properties do not deteriorate compared with cases in which only one part is provided. In addition, when an article which needs to be made invisible is inserted into the rectangular column-shaped space 11, it is possible to install the two parts so as to sandwich the article, and thus the degree of freedom in installation improves, and practicality enhances. For example, even for fixed structures such as columns, it is possible to dispose the parts so as to sandwich the columns in the rectangular column-shaped space and make the columns look transparent as long as optical elements are constituted of two parts. In a case in which optical elements are constituted of a plurality of separable members, handling properties are favorable as long as the respective parts include the cuboid portion 15 (refer to FIG. 1) in a part thereof as in the optical elements 8 to 10 of FIG. 8, which is preferable.

Meanwhile, transparent bodies having the shapes as in the design modification examples 1 to 5 of the first embodiment may be constituted of two or more parts instead of having an integrated structure.

In a case in which two or more parts are used to constitute one optical element, all of the parts are preferably made of the same material since optical matching properties are favorable. In addition, when optical elements are constituted by combining parts having the same shape together as in the elements 9 and 10 of FIG. 7, only parts having the same shape need to be produced, and molds for extrusion molding or injection molding which are used to produce parts also need to be oriented only for parts having the same shape, which enhances productivity.

Next, an optical element of a second embodiment will be described with reference to FIGS. 9A and 9B.

Figure 9A:
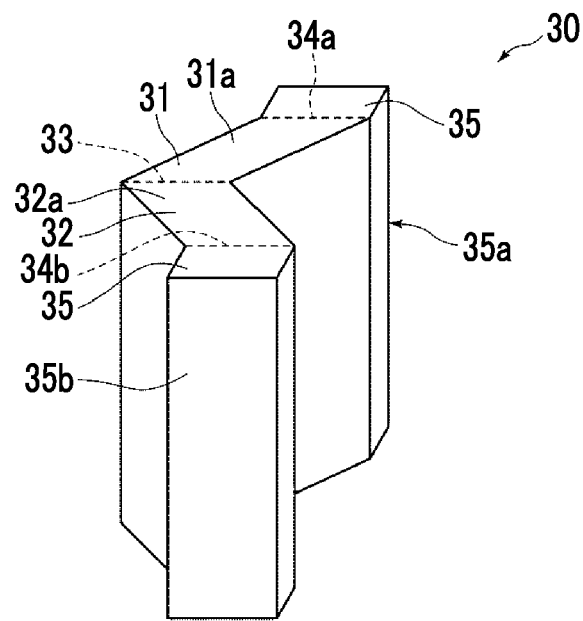
FIG. 9A is a perspective view of a second embodiment of the optical element of the present invention.
Figure 9B:
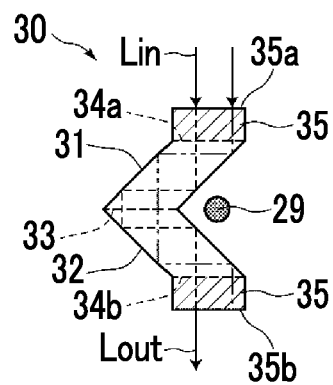
FIG. 9B is a plan view of the optical element illustrated in FIG. 9A.

FIG. 9A is a perspective view of an optical element 30 of the second embodiment, and FIG. 9B is a plan view of the optical element 30 illustrated in FIG. 9A. The optical element 30 is also a part for constituting the optical element 9 illustrated in FIG. 8.

The optical element 30 illustrated in FIGS. 9A and 9B has a main body portion formed by connecting two prismatic bodies 31 and 32 which have parallelogram-shaped bottom surfaces having inner angles of 45° and 135° and have the same shape using one side surface of each of the two prismatic bodies 31 and 32 as a connection surface 33 so that the 45° inner angles and the 135° inner angles come close to each other and protrusion portions 35 which protrude outside from surfaces 34a and 34b facing the connection surface 33 of the main body portion and have surfaces 35a and 35b parallel to the facing surfaces 34a and 34b.

Meanwhile, the inner angles of 45° and 135° of the two prismatic bodies 31 and 32 may have an error of ±5°. That is, the two prismatic bodies 31 and 32 may have parallelogram-shaped bottom surfaces having inner angles of 45°±5° and 135°±5°.

This optical element 30 has a constitution in which, as illustrated in FIG. 9B, light incident through the outer wall surface 35a undergoes repetitive total reflection in the main body portion formed by connecting the two prismatic bodies 31 and 32 and exits through the outer wall surface 35b. Therefore, according to the same principle as in the case of the first embodiment, when the element 30 is directly seen from the outer wall surface 35b, landscapes outside the outer wall surface 35a are shown. Therefore, when the element 30 is seen from the outer wall surface 35b, an article 29 disposed inside the L-shaped wall surface is made to look transparent and is invisible. Therefore, the optical element can be used as an optical camouflage element. Meanwhile, when the inner angles of the prismatic bodies 31 and 32 deviate from 45° and 135°, images on one wall surface side seen from the other outer wall surface are distorted; however, when the inner angles deviate by approximately ±5°, the optical element can be used without any obstacles.

The optical element 30 of the present embodiment can be used singly; however, as described above, it is also possible to constitute the optical element 9 of FIG. 8 by bringing the protrusion portions 35 close to each other so that two optical elements are symmetrically disposed and combined together.

Figure 10:
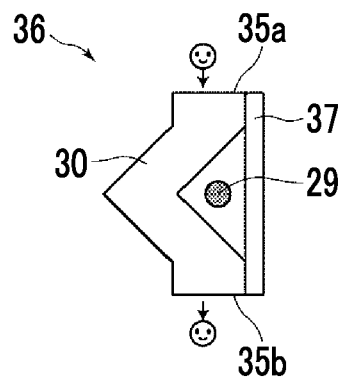
FIG. 10 is a plan view of an optical element of a design modification example 1 of the second embodiment.

In addition, as illustrated in FIG. 10 as an optical element 36 of a design modification example 1 of the second embodiment, a constitution may be provided in which the optical element is combined with a screening plate 37 so as to enable the article 29 which needs to be screened to be disposed inside the L shape of the optical element 30. Meanwhile, instead of the screening plate 37, wall surfaces of buildings, construction products, and the like may be used.

Figure 11:
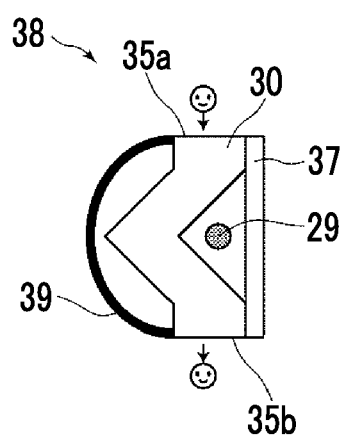
FIG. 11 is a plan view of an optical element of a design modification example 2 of the second embodiment.

Furthermore, as illustrated in FIG. 11 as an optical element 38 of a design modification example 2 of the second embodiment, a constitution may be provided in which a screening plate 39 covering the outside of the L shape is further disposed in the design modification example 1.

As schematically illustrated in the optical elements 36 and 38 of FIGS. 10 and 11, in this case as well, it is possible to see an article present outside one wall surface 35a from the other wall surface 35b side and make the article 29 disposed inside the L-shaped wall surface to substantially look transparent.

Figure 12:
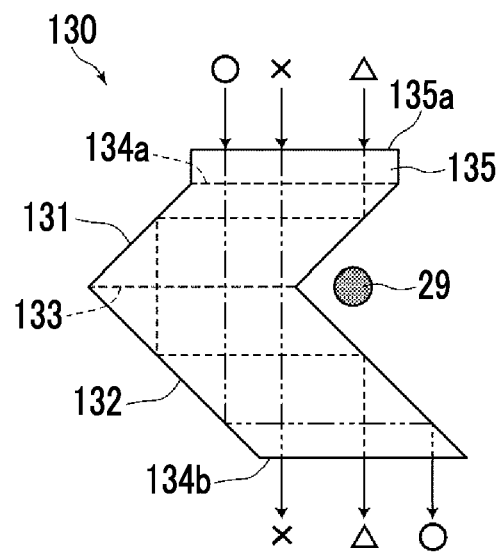
FIG. 12 is a plan view of an optical element of a design modification example 3 of the second embodiment.

FIG. 12 is a plan view illustrating an optical element 130 of a design modification example 3 of the second embodiment. The optical element 30 illustrated in FIGS. 9 to 11 comprises the main body portion in which two prismatic bodies having the same shape are connected to each other, but the optical element 130 of FIG. 12 is an example in which the shapes of prismatic bodies 131 and 132 are not the same as each other. Here, the two prismatic bodies 131 and 132 have the same shape in the side surfaces which serves as a connection surface 133. The optical element 130 comprises the main body made up of the two prismatic bodies 131 and 132 and a protrusion portion 135 which protrudes outside from one surfaces 134a facing the connection surface 133 of the main body portion and has a surface 135a parallel to a facing surface 134a.

This optical element 130 also has a constitution in which, as illustrated in FIG. 12, light incident through the outer wall surface 135a undergoes repetitive total reflection in the main body portion formed by connecting the two prismatic bodies 131 and 132 and exits through the outer wall surface 134b. In the present example, since the prismatic bodies 131 and 132 do not have the same shape, that is, are not symmetric to each other, images on the wall surface 135a and images shown on the other wall surface 135b are different from each other. As illustrated in FIG. 12, an image including circle (○), cross (X), and triangle (Δ) arranged in this order on the wall surface 135a side is shown to include X, Δ, and ○ in this order on the wall surface 135b side.

However, even in the above-described constitution, it is possible to make the article 29 disposed inside the L-shaped wall surface to substantially look transparent and use the optical element as an optical camouflage element.

Next, an optical element of a third embodiment will be described with reference to FIGS. 13A to 13E and 14.

Figure 13A:
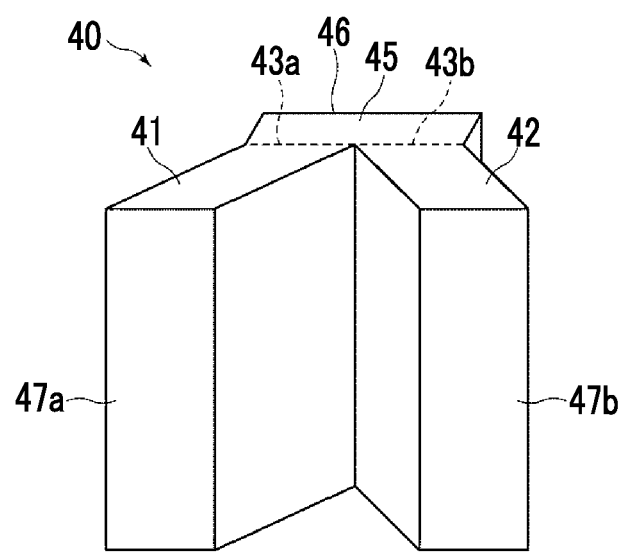
FIG. 13A is a perspective view illustrating an optical element of a third embodiment.
Figure 13B:
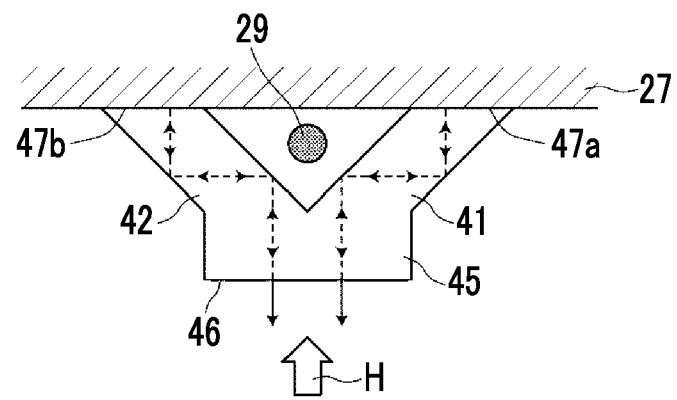
FIG. 13B is a plan view illustrating an example of a method for using the optical element of the third embodiment.
Figure 13C:
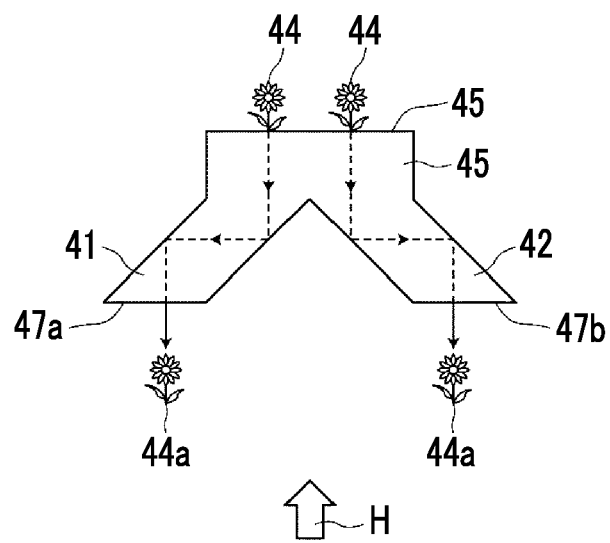
FIG. 13C is a plan view illustrating an example of another method for using the optical element of the third embodiment.

FIG. 13A is a perspective view of an optical element 48 of the third embodiment, and FIGS. 13B and 13C are plan views for describing an usage example of the optical element illustrated in FIG. 13A. Meanwhile, the optical element 40 is also a part for constituting the optical element 10 illustrated in FIG. 8.

The optical element 40 is a transparent member formed by disposing two prismatic bodies 41 and 42 which have the same shape and have parallelogram-shaped bottom surfaces having inner angles of 45° and 135° so that, when seen in a plan view, the respective 45° inner angles are brought into contact with each other at an angle of 90°, that is, one of two sides of one prismatic body which constitute the 45° inner angle is brought into contact with the corresponding side of the other prismatic body so as to form an angle of 90° and connecting side surfaces 43a and 43b of the respective prismatic bodies as a single surface to one surface of a parallel plate 45.

Meanwhile, the inner angles of 45° and 135° of the two prismatic bodies 41 and 42 may have an error of ±5°. That is, the two prismatic bodies 41 and 42 may have parallelogram-shaped bottom surfaces having inner angles of 45°±5° and 135°±5°.

FIG. 13B illustrates a state in which side surfaces 47a and 47b facing the side surfaces 43a and 43b of the prismatic bodies 41 and 42 of the optical element 40 is disposed so as to stick to a wall 27. When the article 29 is disposed between the wall 27 and the wall surfaces constituting the L shape of the optical element 40, the shape of the wall 27 with which the side surfaces 47a and 47b are in contact is visible when the other surface 46 of the parallel plate 45 is seen from an arrow H in FIG. 13B, but the article 29 is not visible from the arrow H and is made to look transparent. When the shape of the wall 27 is a horizontal streak (a strip extending horizontally in the drawing), and the shape of the surface with which the side surfaces 47a and 47b of the optical element 40 are in contact continues, no senses of strangeness are caused in a case in which the shape is seen from the arrow H. Therefore, it is possible to use the optical element as an optical camouflage element.

Meanwhile, when the inner angles of the prismatic bodies 41 and 42 deviate from 45° and 135°, images on one wall surface side seen from the other outer wall surface are distorted; however, when the inner angles deviate by approximately ±5°, the optical element can be used without any obstacles.

FIG. 13C schematically illustrates a case in which the optical element 40 is seen from the arrow H, that is, the side surfaces 47a and 47b are seen from the arrow H. When two flowers 44 disposed on a surface 46 side of the optical element 40 are seen from the arrow H, as a result of total reflection in the block, images 44a thereof are visible on the surfaces 47a and 47b. Therefore, it also becomes possible to use the optical element in this form as an optical camouflage.

Figure 13D:
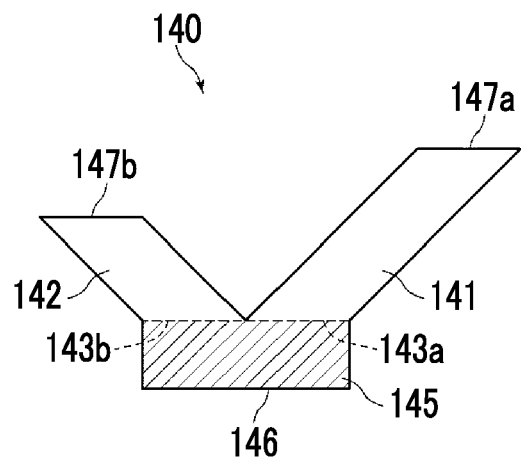
FIG. 13D is a plan view of an optical element of a design modification example 1 of the optical element of the third embodiment.
Figure 13E:
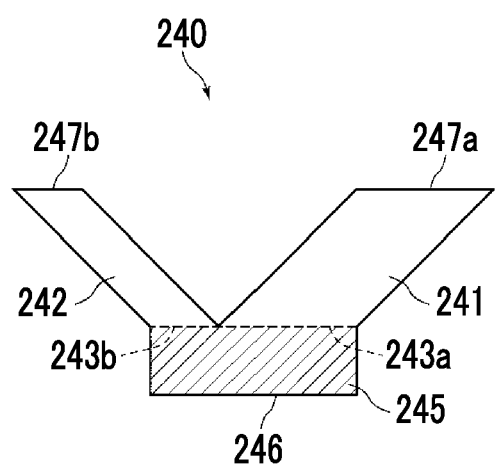
FIG. 13E is a plan view of an optical element of a design modification example 2 of the optical element of the third embodiment.

FIG. 13D is a plan view of an optical element 140 of a design modification example 1 of the third embodiment, and FIG. 13E is a plan view of an optical element 240 of a design modification example 2 of the third embodiment.

The optical element 40 illustrated in FIG. 13A comprises the main body portion having a shape in which two prismatic bodies having the same shape are disposed in a linear symmetric manner, but the optical element 140 of FIG. 13D is an example in which prismatic bodies 141 and 142 have different shapes. Here, the optical element has a shape in which side surfaces 143a and 143b of the two prismatic bodies 141 and 142 form a single surface and are connected to one surface of a parallel plate 145. The lengths of a set of sides (sides different from the side connected to the parallel plate) of the parallelogram of the bottom surface of the prismatic body 141 are different from those of the corresponding set of sides of the prismatic body 142, and a side surface 147a of the prismatic body 141 is located farther away from the other surface 146 of the parallel plate 145 than a side surface 147b of the prismatic body 142. Even in the case of the present optical element 140 in which the shapes of the two prismatic bodies are different from each other as described above, it is possible to observe images on the side surfaces 147a and 147b side of the prismatic bodies from the other surface 146 of the parallel plate 145, and it is possible to make articles disposed in the inside of the wall surfaces constituting the L shape of the optical member look transparent. Therefore, similar to the optical element 40 illustrated in FIG. 13A, it is possible to use the optical element as an optical camouflage element.

Similarly, the optical element 240 of FIG. 13E is an example in which prismatic bodies 241 and 242 have different shapes. Here, the optical element has a shape in which side surfaces 243a and 243b of the two prismatic bodies 241 and 242 form a single surface and are connected to one surface of a parallel plate 245. The lengths of a set of sides (sides different from the side connected to one surface of the parallel plate 245) of the parallelogram of the bottom surface of the prismatic body 241 are different from those of the corresponding set of sides of the prismatic body 242. Even in the case of the present optical element 240 in which the shapes of the two prismatic bodies are different from each other as described above, it is possible to observe images on the side surfaces 247a and 247b side of the prismatic bodies from the other surface 246 of the parallel plate 245, and it is possible to make articles disposed in the inside of the wall surfaces constituting the L shape of the optical member look transparent. Therefore, similar to the optical element 40 illustrated in FIG. 13A, it is possible to use the optical element as an optical camouflage element.

Figure 14:
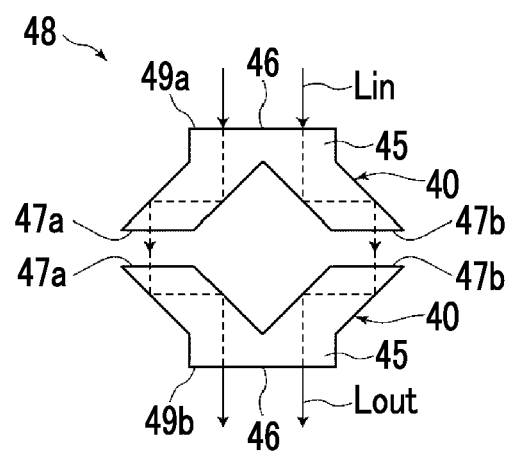
FIG. 14 is a plan view of an optical element constituted by combining two optical elements of the third embodiment.

FIG. 14 is a plan view of an optical element 48 constituted by combining two optical elements 40 illustrated in FIG. 13A.

The optical element 48 is constituted by symmetrically disposing two optical elements 40 as parts so that the side surfaces 47a and 47b facing the side surfaces 43a and 43b of the prismatic bodies face each other.

Meanwhile, a constitution in which two present parts 40 are connected to each other so that the side surfaces 47a and 47a come into contact with the side surfaces 47b and 47b is the optical element 10 of FIG. 8.

In the present optical element 48, gaps are provided between the side surfaces 47a and between the side surfaces 47b. Even when gaps are present between the two parts 40 and 40 as described above, there are no influences on the effects of optical camouflage as long as the surfaces 47a and 47a and the surfaces 47b and 47b of both parts which face each other are vertically disposed.

In the gaps between the parts 40 and 40 in the present optical element 48, it is possible to install shutters or insert semi-transparent bodies. When shutters are provided therebetween, it is possible to turn the fields of view on and off.

Figure 15:
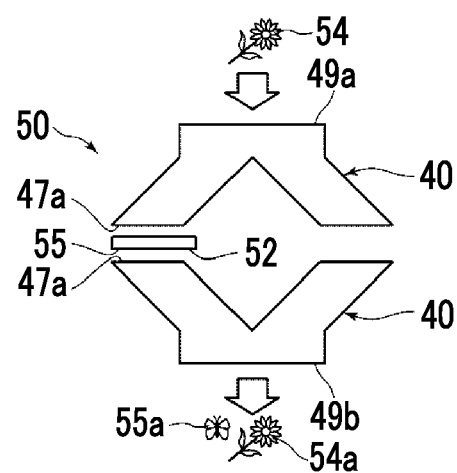
FIG. 15 is a plan view for describing a usage embodiment of the optical element illustrated in FIG. 14.

In addition, as in an optical element 50 of a design modification example of the optical element 48 illustrated in FIG. 15, when a semi-transparent body 52 is inserted in a gap between the parts 40 and 40, that is, between the surfaces 47a and 47a, it becomes possible to superimpose images passing through the semi-transparent body 52 on transmitted images. For example, in a case in which a glass plate having a shape (drawing) of a butterfly 55 in a part thereof is inserted as the transparent body 52, it is possible to see images 54a and 55a in which a flower 54 placed outside the surface 49a of the part 40 and the butterfly 55 in the glass plate are superimposed together from the surface 49b side of the other part 40.

Figure 16:
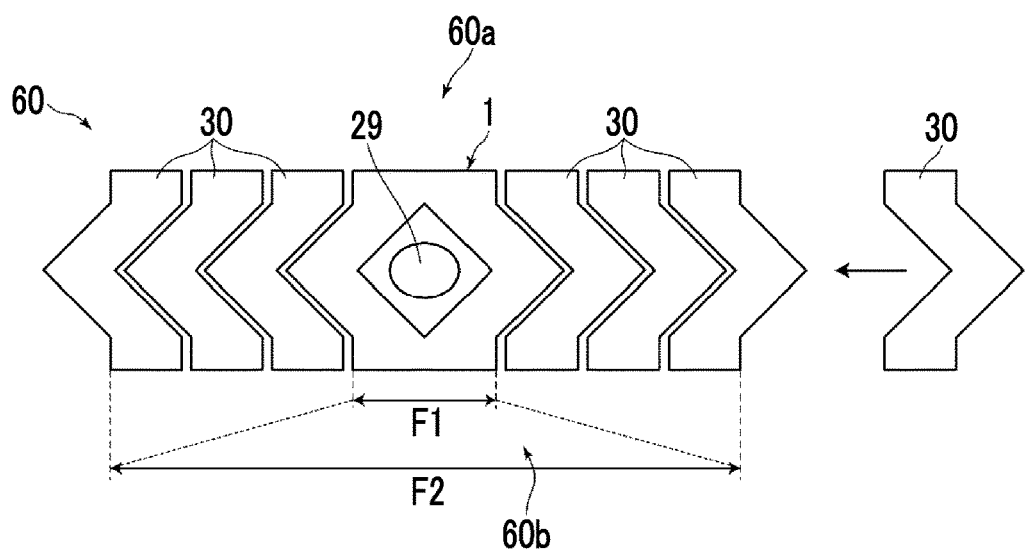
FIG. 16 is a plan view of a fourth embodiment of the optical element of the present invention.

FIG. 16 is a plan view of an optical element 60 of a fourth embodiment of the present invention.

The present optical element 60 is constituted of a combination of the optical element 1 of the first embodiment (hereinafter, referred to as the first element 1) and the optical elements 30 of the second embodiment (hereinafter, referred to as the second element 30). When the first element 1 is disposed in the center, and a plurality of the second elements 30 are combined to both sides of the first element, it is possible to enlarge the width F1 of the original incidence and exit surface to a desired width F2. The present element 60 is an embodiment of an extended optical element. Here, when the first element 1, and the second element 30 and the second element 30 which are disposed in an extension direction of the incidence and exit surface of the first element are disposed with small voids of approximately 1 to 2 μm opened therebetween, although void portions are observed in streak shapes, it is possible to see a wide range of an incidence surface 60a from an exit surface 60b. In this case, light incident on the respective elements from the incidence surface 60a side all undergoes repetitive total reflection in the respective elements and exits from the respective elements.

In a case in which the first element 1 and the second element 30 are constituted of the same material, the first element and the second elements may be disposed in direct contact with each other without providing any gaps between the first element 1 and the second element 30 and between the second elements 30. In this case, light incident through the incidence surface 60a side travels straight and exits through the exit surface 60b except at portions in which the light is reflected by the inner wall surfaces in the first element 1.

Figure 17:
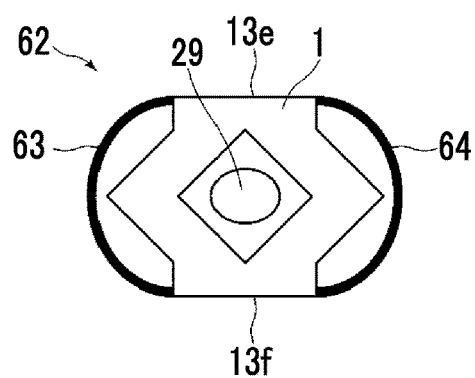
FIG. 17 is a plan view of a fifth embodiment of the optical element of the present invention.

FIG. 17 is a plan view of an optical element 62 of a fifth embodiment of the present invention.

The present optical element 62 comprises a screening plate 63 covering the outer wall surfaces 13a and 13b of the optical element 1 of the first embodiment and a screening plate 64 covering the outer wall surfaces 13c and 13d. When the end portions of the optical element 1 are screened by comprising the screening plates 63 and 64, it is possible to further enhance visual effects with which the article 29 disposed inside is made to look transparent when the optical element 1 is seen from the outer wall surface 13e.

Hereinafter, embodiments of a lamp housing of the present invention will be described. The lamp housing of the present invention comprises the above-described optical element.

Figure 18:
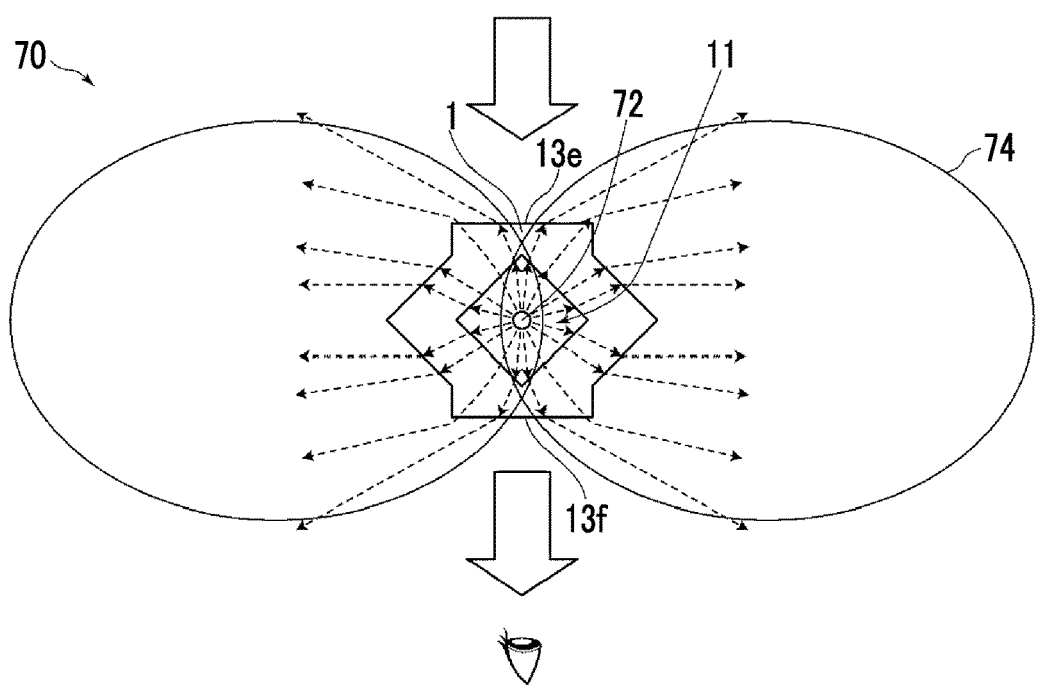
FIG. 18 is a plan view illustrating a first embodiment of a lamp housing of the present invention.

FIG. 18 illustrates a plan view of a lamp housing of a first embodiment. A lamp housing 70 is constituted of the optical element 1 and a lamp 72 disposed in the rectangular column-shaped space 11 in the center of the optical element. Light from the lamp 72 disposed in the optical element 1 is extracted in the horizontal direction of the optical element 1 as illustrated in FIG. 18. From the outer wall surface 13f side of the optical element 1, landscapes of the outer wall surface 13e are visible, and the lamp 72 disposed inside is not visible.

As the lamp 72, fluorescent lamps, incandescent lamps, LEDs, and the like can be used, and there is no particular limitation.

The lamp housing 70 may be fixed by bringing the outer wall surface 13f into contact with walls of construction products and the like and be used as indirect lighting.

Figure 19:
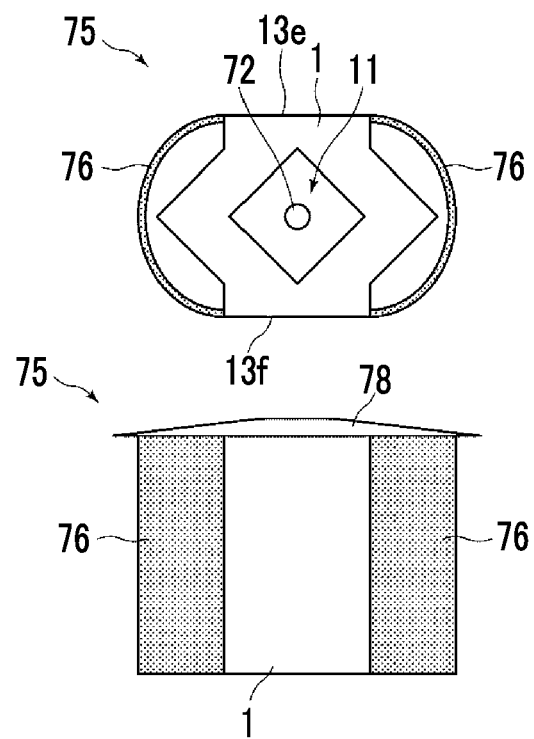
FIG. 19 illustrates a plan view and a front view illustrating a second embodiment of the lamp housing of the present invention.

FIG. 19 illustrates a plan view and a front view of a lamp housing 75 of a second embodiment of the present invention. In the lamp housing 75 of the present embodiment, in addition to the optical element 1 and the lamp 72 disposed in the rectangular column-shaped space 11 in the center of the optical element, diffusion plates 76 are disposed on both sides of the optical element 1 which correspond to the emission direction of light from the lamp 72, and furthermore, a reflection plate 78 is provided so as to cover the top surface of the optical element 1.

When the diffusion plates 76 and the reflection plate 78 are provided, it is possible to enhance the directionality of light extracted from the optical element 1.

Figure 20:
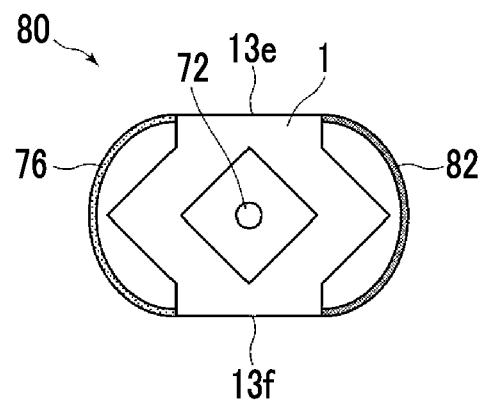
FIG. 20 is a plan view illustrating a third embodiment of the lamp housing of the present invention.
Figure 21:
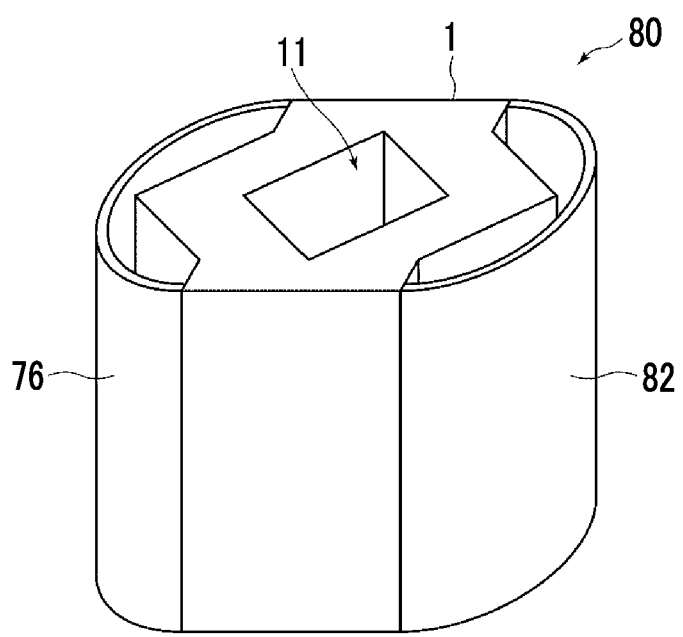
FIG. 21 is a perspective view of the lamp housing illustrated in FIG. 20.

FIG. 20 is a plan view of a lamp housing 80 of a third embodiment of the present invention. FIG. 21 is a perspective view of the lamp housing 80. The lamp housing 80 of the present embodiment has a constitution in which, in addition to the optical element 1 and the lamp 72 disposed in the rectangular column-shaped space 11 in the center of the optical element, one side surface side of the optical element 1 which corresponds to the light emission direction of the lamp 72 is covered with the diffusion plate 76, and the other side surface side is covered with a reflection plate 82. As described above, the present lamp housing is constituted so that the emission direction of light from the lamp 72 disposed in the optical element 1 is controlled by providing the reflection plate 82 and the diffusion plate 76 and light is emitted only toward the diffusion plate 76 side.

Figure 22:
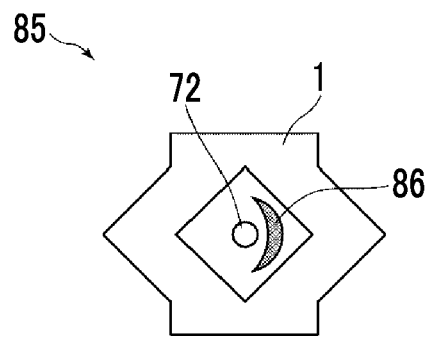
FIG. 22 is a plan view illustrating a fourth embodiment of the lamp housing of the present invention.
Figure 23:
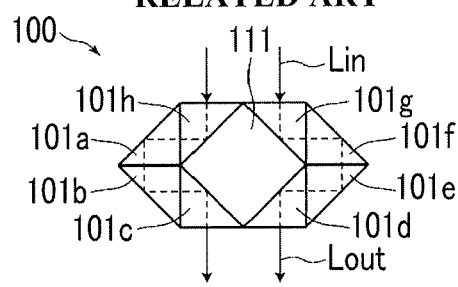
FIG. 23 is a plan view schematically illustrating an optical camouflage structure of the related art.
Figure 24:
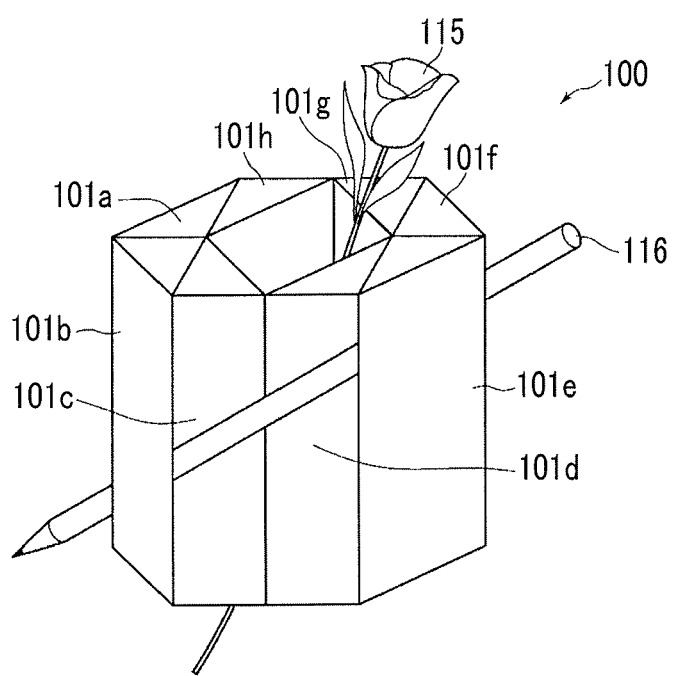
FIG. 24 is a perspective view schematically illustrating the optical camouflage structure of the related art.

FIG. 22 is a plan view of a lamp housing 85 a fourth embodiment of the present invention. The lamp housing 85 of the present embodiment comprises the optical element 1, the lamp 72 disposed in the rectangular column-shaped space 11 in the center of the optical element, and a reflection plate 86 having an arc sectional shape which reflects light from the lamp. When the reflection plate 86 is inserted into the rectangular column-shaped space 11, it is possible to enhance the directionality of emitted light generated from the optical element 1. Even in this case, from the outer wall surface 13f side of the optical element 1, landscapes of the outer wall surface 13e are visible, and the lamp 72 and the reflection plate 86 which are disposed inside are made to look transparent and are not visible.

In the respective lamp housings described above, examples in which the optical element 1 integrally constituted of a single member is provided have been described, but the lamp housing may also comprise optical elements constituted of two parts as illustrated in FIG. 8. In addition, the shapes of optical elements are also not limited to the shape of the optical element 1. For example, in the design modification examples of the optical element of the second embodiment illustrated in FIGS. 12 and 13, it is also possible to use the optical elements as lamp housings by disposing a lamp instead of the article 29 which needs to be made to look transparent.

What is claimed is:

1. An optical element comprising:
   a polygonal column-shaped transparent body which has four inner wall surfaces that surround a rectangular column-shaped space having a square-shaped opening when seen in a plan view, four outer wall surfaces that are respectively parallel to the inner wall surfaces, two outer wall surfaces which are perpendicular to a diagonal line of the square-shaped opening, the two outer wall surfaces facing each other, and two side wall surfaces that are perpendicularly connected to at least one of the two outer wall surfaces and are connected to at least one of the four outer wall surfaces,
   wherein, in the transparent body, a distance between the two outer wall surfaces facing each other is longer than the diagonal line,
   wherein light perpendicularly incident on one outer wall surface of the two outer wall surfaces facing each other undergoes repetitive total reflection on the inner wall surfaces and the outer wall surfaces and, finally, exits along almost the same axis as a light axis of light incident through the other outer wall surface of the two outer wall surfaces facing each other, and
   wherein a cuboid-shaped protrusion portion formed by the two side wall surfaces and the one of the two outer wall surfaces does not contribute to path changes caused by the total reflection of light.

2. The optical element according to claim 1, wherein a refractive index is 1.41 or higher.

3. The optical element according to claim 1 which consists of any one of acryl, polycarbonate, cycloolefin-based resin, and glass or a mixture of two or more of these materials.

4. The optical element according to claim 1, further comprising:
   a screen that covers side surfaces other than the two outer wall surfaces facing each other.

5. A lamp housing comprising:
   an optical element comprising:
      a polygonal column-shaped transparent body which has four inner wall surfaces that surround a rectangular column-shaped space having a square-shaped opening when seen in a plan view, four outer wall surfaces that are respectively parallel to the inner wall surfaces, two outer wall surfaces which are perpendicular to a diagonal line of the square-shaped opening, the two outer wall surfaces facing each other, and two side wall surfaces that are perpendicularly connected to at least one of the two outer wall surfaces and are connected to at least one of the four outer wall surfaces,
   wherein, in the transparent body, a distance between the two outer wall surfaces facing each other is longer than the diagonal line, and
   wherein light perpendicularly incident on one outer wall surface of the two outer wall surfaces facing each other undergoes repetitive total reflection on the inner wall surfaces and the outer wall surfaces and, finally, exits along almost the same axis as a light axis of light incident through the other outer wall surface of the two outer wall surfaces facing each other, and
   a lamp disposed in a rectangular column-shaped space surrounded by the four inner walls of the optical element.

6. The lamp housing according to claim 5, further comprising:
   a reflection plate having an arc sectional shape which reflects light from the lamp in the rectangular column-shaped space of the optical element.

7. The lamp housing according to claim 5, further comprising:
   a reflection plate that covers at least a part of the four outer wall surfaces of the optical element and/or a diffusion plate.

8. The lamp housing according to claim 5, further comprising:
   a reflection plate that covers a top surface of the optical element.

9. An optical element comprising:
   a main body portion formed by connecting two prismatic bodies having parallelogram-shaped bottom surfaces having inner angles of 45° and 135° using one side surface of each of the two prismatic bodies as a connection surface so that the 45° inner angles and the 135° inner angles of the respective parallelogram-shaped bottom surfaces come close to each other; and
   at least one cuboid-shaped protrusion portion which protrudes outside from a surface facing the connection surface of the main body portion and has a surface parallel to the surface facing the connection surface;
   wherein the main body portion and the at least one cuboid-shaped protrusion portion have an integrated structure.

10. The optical element according to claim 9, wherein the two prismatic bodies have the same shape.

11. An optical element comprising:
   a polygonal column-shaped transparent body which has four inner wall surfaces that surround a rectangular column-shaped space having a square-shaped opening when seen in a plan view, four outer wall surfaces that are respectively parallel to the inner wall surfaces, two outer wall surfaces which are perpendicular to a diagonal line of the square-shaped opening, the two outer wall surfaces facing each other, and two side wall surfaces that are perpendicularly connected to at least one of the two outer wall surfaces and are connected to at least one of the four outer wall surfaces,
   wherein, in the transparent body, a distance between the two outer wall surfaces facing each other is longer than the diagonal line, and
   light perpendicularly incident on one outer wall surface of the two outer wall surfaces facing each other undergoes repetitive total reflection on the inner wall surfaces and the outer wall surfaces and, finally, exits along almost the same axis as a light axis of light incident through the other outer wall surface of the two outer wall surfaces facing each other which is constituted by bringing the protrusion portions close to each other so that two optical elements, each of which according to claim 10, are symmetrically disposed and combined together.

12. An extended optical element which is formed by combining one or more optical elements according to claim 10 with the optical element comprising:
- a polygonal column-shaped transparent body which has four inner wall surfaces that surround a rectangular column-shaped space having a square-shaped opening when seen in a plan view, four outer wall surfaces that are respectively parallel to the inner wall surfaces, two outer wall surfaces which are perpendicular to a diagonal line of the square-shaped opening, the two outer wall surfaces facing each other, and two side wall surfaces that are perpendicularly connected to at least one of the two outer wall surfaces and are connected to at least one of the four outer wall surfaces,
- wherein, in the transparent body, a distance between the two outer wall surfaces facing each other is longer than the diagonal line, and
- light perpendicularly incident on one outer wall surface of the two outer wall surfaces facing each other undergoes repetitive total reflection on the inner wall surfaces and the outer wall surfaces and, finally, exits along almost the same axis as a light axis of light incident through the other outer wall surface of the two outer wall surfaces facing each other, whereby one outer wall surface and the other outer wall surface of the two outer wall surfaces facing each other are extended.

13. An optical element which is formed by disposing two prismatic bodies having parallelogram-shaped bottom surfaces having inner angles of 45° and 135° so that, when seen in a plan view, one of two sides of one prismatic body which constitute the 45° inner angle is brought into contact with the corresponding side of the other prismatic body so as to form an angle of 90° and connecting side surfaces of the two prismatic bodies as a single surface to one surface of a parallel plate;
- wherein the two prismatic bodies and a parallel plate have an integrated structure.

14. The optical element according to claim 13,
- wherein the two prismatic bodies have the same shape.

15. An optical element comprising:
- a polygonal column-shaped transparent body which has four inner wall surfaces that surround a rectangular column-shaped space having a square-shaped opening when seen in a plan view, four outer wall surfaces that are respectively parallel to the inner wall surfaces, two outer wall surfaces which are perpendicular to a diagonal line of the square-shaped opening, the two outer wall surfaces facing each other, and two side wall surfaces that are perpendicularly connected to at least one of the two outer wall surfaces and are connected to at least one of the four outer wall surfaces,
- wherein, in the transparent body, a distance between the two outer wall surfaces facing each other is longer than the diagonal line, and
- light perpendicularly incident on one outer wall surface of the two outer wall surfaces facing each other undergoes repetitive total reflection on the inner wall surfaces and the outer wall surfaces and, finally, exits along almost the same axis as a light axis of light incident through the other outer wall surface of the two outer wall surfaces facing each other which is constituted by symmetrically disposing two optical elements, each of which according to claim 14, so that side surfaces facing the other side surfaces of the prismatic bodies face each other.

\* \* \* \* \*